United States Patent
Dupuis et al.

(10) Patent No.: US 10,938,981 B2
(45) Date of Patent: Mar. 2, 2021

(54) METHOD AND APPARATUS FOR DETERMINING A BRIDGED TAP LENGTH

(71) Applicant: Nokia Solutions and Networks Oy, Espoo (FI)

(72) Inventors: Nicolas Dupuis, Chaudfontaine (BE); Axel Van Damme, Loyers (BE)

(73) Assignee: Nokia Solutions and Networks Oy, Espoo (FI)

(*) Notice: Subject to any disclaimer, the term of this patent is extended or adjusted under 35 U.S.C. 154(b) by 0 days.

(21) Appl. No.: 16/857,485

(22) Filed: Apr. 24, 2020

(65) Prior Publication Data
US 2020/0366785 A1  Nov. 19, 2020

(30) Foreign Application Priority Data

May 17, 2019 (EP) .................................... 19175102

(51) Int. Cl.
*H04M 3/22* (2006.01)
*G06N 20/00* (2019.01)
*H04M 3/26* (2006.01)
*G06N 3/08* (2006.01)

(52) U.S. Cl.
CPC .......... *H04M 3/2209* (2013.01); *G06N 20/00* (2019.01); *H04M 3/26* (2013.01); *G06N 3/08* (2013.01)

(58) Field of Classification Search
CPC ............ H04M 3/22; H04M 3/26; H04M 3/18; H04M 3/30; H04M 1/24; H04M 11/062; H04M 3/306; G06N 20/00
USPC ......... 379/24, 22.03, 26.01, 1.04, 1.01, 1.03
See application file for complete search history.

(56) References Cited

U.S. PATENT DOCUMENTS

| | | | |
|---|---|---|---|
| 8,559,489 B2 | 10/2013 | Belge et al. | |
| 2002/0090060 A1* | 7/2002 | Rudinsky | G06Q 10/06 379/27.01 |
| 2002/0186760 A1* | 12/2002 | Bostoen | H04L 25/10 375/224 |
| 2003/0007605 A1* | 1/2003 | Rosen | H04M 3/30 379/1.04 |

(Continued)

FOREIGN PATENT DOCUMENTS

EP   3070917 A1   9/2016

OTHER PUBLICATIONS

Extended European Search Report for Application No./Patent No. 19175102.3-1205, Reference No. 316290-EP-EPA for Applicant Nokia Solutions and Technologies Oy dated Feb. 7, 2020.

*Primary Examiner* — Melur Ramakrishnaiah
(74) *Attorney, Agent, or Firm* — Harness, Dickey & Pierce, P.L.C.

(57) ABSTRACT

The apparatus includes a memory configured to store executable code; and a processor configured to execute the executable code and cause the apparatus to perform the operations of generating and training. The generating generates a dataset specifying, for a plurality of communication lines, i) a channel frequency response of a communication line having one or two bridged taps, and ii) a set of M lengths of bridged taps associated with the communication line, with M greater than one. The training trains, based on the dataset, a machine learning model, the machine learning model configured for determining, based on the channel frequency response of a communication line, a set of M lengths of bridged taps associated with the communication line.

14 Claims, 2 Drawing Sheets

(56) References Cited

U.S. PATENT DOCUMENTS

| | | | |
|---|---|---|---|
| 2013/0290507 A1* | 10/2013 | Drooghaag | H04L 41/14 709/223 |
| 2015/0117634 A1* | 4/2015 | Dardenne | H04M 3/26 379/380 |
| 2015/0124860 A1* | 5/2015 | Belge | H04M 3/306 375/222 |

* cited by examiner

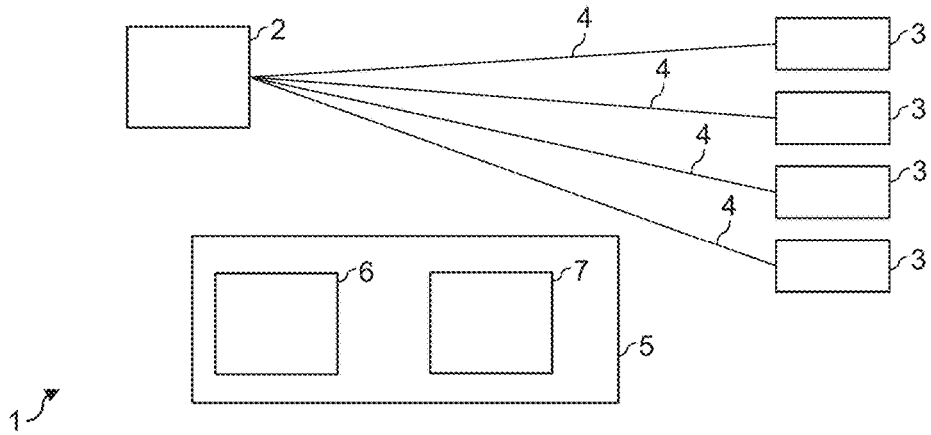
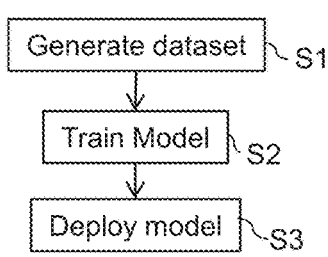
FIG. 3
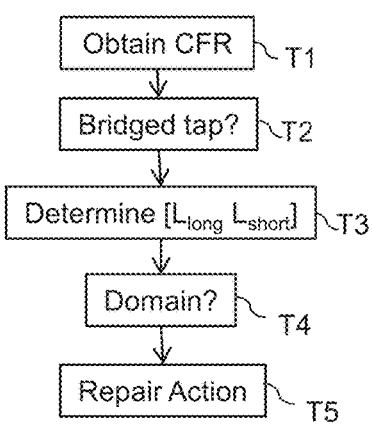
FIG. 4
FIG. 6
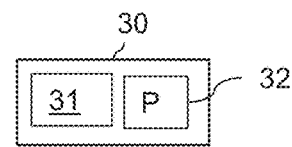
FIG. 7
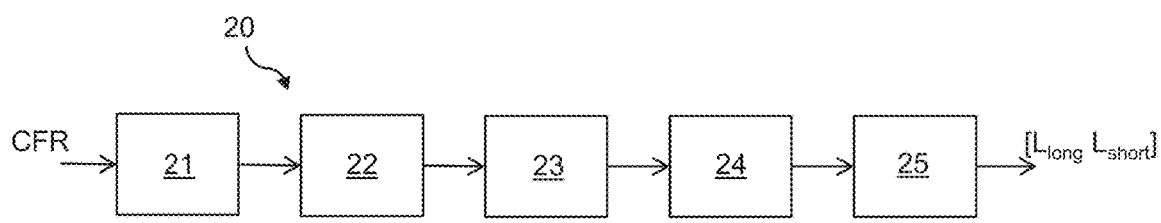
FIG. 5

METHOD AND APPARATUS FOR DETERMINING A BRIDGED TAP LENGTH

The present application claims priority under 35 U.S.C. § 119 to European Patent Application No. 19175102.3, filed May 17, 2019, in the European Patent Office, the entire contents of which are hereby incorporated by reference.

FIELD OF THE INVENTION

The present invention relates to the field of telecommunication. In particular, the present invention relates to a method and an apparatus for determining the length of a bridged tap in a communication line.

BACKGROUND

Communication lines, for example used for DSL communication, sometimes present a special topological configuration: A double path, also known as bridged tap, is connected to the main line. From an operator perspective, the presence of one or more bridged taps affects the quality of service. This occurs as speed reduction, presence of erroneous service, some connection losses, etc. There is therefore a need for detecting the bridged taps. Moreover, operators are in seek for suitable recommendations, i.e. for insights on the most appropriate actions to take in order to restore the end-user's experience as well as a high-level of satisfaction within the shortest time. Under that context, estimating accurately the lengths of the detected bridged taps allows the operator to state about the domain of application of these bridged taps (e.g. field/street vs. home) or even make a distinction between cables within buildings/home. As such, this offers the possibility to address the domain separation problem, very important in the competitive context of service providers and copper owner.

The channel frequency response of a communication line represents the attenuation of the medium on the emitted signal for respective frequencies. In a multi-tones communication system such as DSL, it may be used to fill an appropriate number of bits over the different frequency carriers. Also, analyzing the channel frequency response of a communication line allows detecting and characterizing impairments affecting the communication line. For example, empirical analysis of the channel frequency response allows estimating the length of a bridged tap.

SUMMARY

It is thus an object of embodiments of the present invention to propose a method and an apparatus for estimating bridged tap length, which do not show the inherent shortcomings of the prior art.

Accordingly, embodiments relate to an apparatus comprising means configured for:
  generating a dataset specifying, for a plurality of communication lines:
    a channel frequency response of a communication line having one or two bridged taps, and
    a set of M lengths of bridged taps associated with the communication line, with M greater than one,
  training, based on the dataset, a machine learning model configured for determining, based on the channel frequency response of a communication line, a set of M lengths of bridged taps associated with the communication line.

In some embodiments, training the machine leaning model comprises updating parameters of the machine learning model based on an error representative of a relative comparison between target lengths and predicted lengths.

In some embodiments, training the machine leaning model comprises updating parameters of the machine learning model based on an error representative of a comparison between target lengths and predicted lengths and of a length distribution associated with a communication network.

In some embodiments, said means are further configured for determining said length distribution based on iteratively:
  updating parameters of the machine learning model based on the dataset and a current estimation of the length distribution,
  determining lengths based on the updated machine learning model and channel frequency responses of communication lines of a real communication network, and
  updating the current estimation of the length distribution based on the determined lengths.

In some embodiments, generating the dataset comprises determining channel frequency responses based on circuit simulation.

In some embodiments, generating the dataset comprises determining channel frequency responses for a plurality of communication lines having a single wire bridged tap and for a plurality of communication lines having a double wire bridged tap.

In some embodiments, generating the dataset comprises determining channel frequency responses for a plurality of communication lines having an open-ended bridged tap and for a plurality of communication lines having a close-ended bridged tap.

In some embodiments, generating the dataset comprises determining channel frequency responses for a plurality of communication lines having only one bridged tap and for a plurality of communication lines having at least two bridged taps.

In some embodiments, the means are further configured for:
  obtaining the channel frequency response of a communication line,
  determining a set of M lengths of bridged taps associated with the communication line, based on the channel frequency response and the trained machine learning model.

Embodiments also relate to a computer-implemented method comprising:
  generating a dataset specifying, for a plurality of communication lines:
    a channel frequency response of a communication line having one or two bridged taps, and
    a set of M lengths of bridged taps associated with the communication line, with M greater than one,
  training, based on the dataset, a machine learning model configured for determining, based on the channel frequency response of a communication line, a set of M lengths of bridged taps associated with the communication line.

In some embodiments, the method comprises deploying the trained machine learning model in another apparatus.

Embodiments also relate to an apparatus obtained by the above method, comprising means configured for:
  obtaining the channel frequency response of a communication line, determining a set of M lengths of bridged taps associated with the communication line, based on the channel frequency response and the trained machine learning model.

Embodiments also relates to a computer-implemented method for monitoring a communication network, comprising:

obtaining the channel frequency response of a communication line, determining a set of M lengths of bridged taps associated with the communication line, based on the channel frequency response and a trained machine learning model generated by the method above.

In some embodiments, said means include at least one processor and at least one memory, the at least one memory storing instructions, the at least one memory and the instructions being configured to, with the at least one processor, cause the apparatus to at least in part perform the functions discussed above.

Embodiments also relate to a computer program comprising instructions for performing the method mentioned before when said instructions are executed by a computer. The computer program may be stored on a computer readable medium. The computer readable medium may be a non-transitory computer readable medium.

The scope of protection sought for various embodiments of the invention is set out by the independent claims. The embodiments and features, if any, described in this specification that do not fall under the scope of the independent claims are to be interpreted as examples useful for understanding various embodiments of the invention.

BRIEF DESCRIPTION OF THE DRAWINGS

The above and other objects and features of the invention will become more apparent and the invention itself will be best understood by referring to the following description of embodiments taken in conjunction with the accompanying drawings wherein:

FIG. 3 is a block diagram of communication network, FIG. 4 is a flowchart of a method executed in the communication network of FIG. 3, FIG. 5 is a block diagram of a machine learning model configured for predicting, based on the channel frequency response of a communication line, the length of bridged taps connected to the communication line, FIG. 6 is a flowchart of a method executed in the communication network of FIG. 3, and FIG. 7 is a structural view of an apparatus used in the network of FIG. 3.

DESCRIPTION OF EMBODIMENTS

Figure 1:
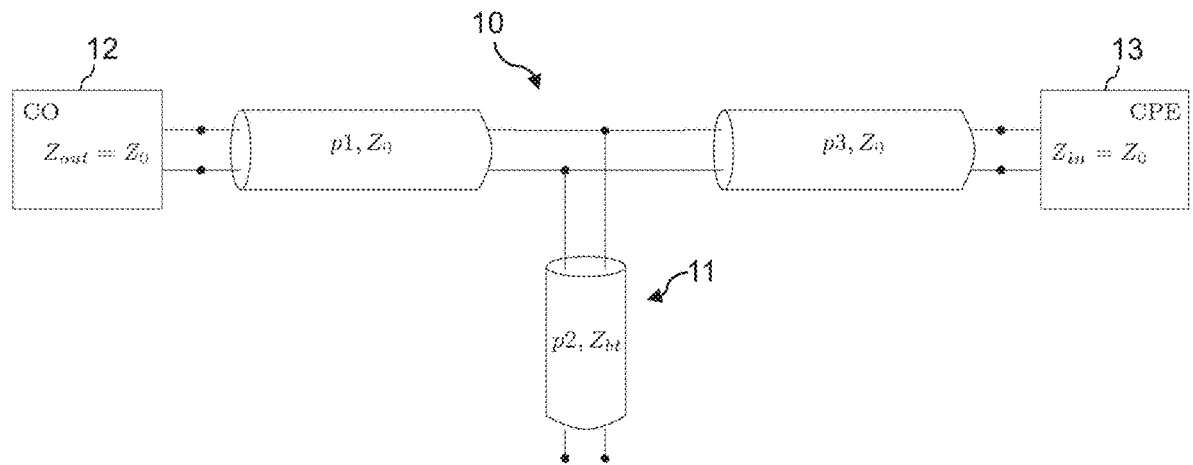
FIG. 1 is a circuit diagram of a communication line having a bridged tap.

FIG. 1 is a circuit diagram of a communication line 10 having a bridged tap 11. The communication line 10 comprises a pair of wires extending between two communication nodes. For example, the communication line 10 extends between an access node 12 located in a central office or street cabinet of a network operator and a customer premises equipment 13 located in a customer building, for example a house or an office. The access node 12 and the customer premises equipment 13 may use DSL technology, for example ADSL, VDSL2, G.Fast . . . for data communication over the communication line 10.

The bridged tap 11 comprises a wire or a pair of wires connected to the communication line 10. The bridged tap 11 may present various configuration based on:

located in a network operator domain (e.g. central office), in the street/field domain, or in the customer domain.

Two wires or single wire

Termination: open-ended or connected to a device, e.g. a phone,

Length

Type of cable (gauge/insulator), impedance

. . .

The bridged tap 11 affects the communication over the communication line 10, for example in terms of speed reduction, presence of erroneous service, some connection losses, etc. It is therefore desirable for a network operator to be able to detect that a communication line is affected by one or more bridged taps, and to characterize the bridged taps, in particular to estimate their lengths.

From a proactive network wide perspective, operators are willing to prioritize their field interventions to remove impairments on DSL lines where they can ensure that removing the impairment will significantly improve the line performance. In this context, using a reliable method to estimate the bridged tap length and ranking/sorting the results network wide will improve customer strategy on the next best action to improve their network.

From a reactive single DSL line scenario (Helpdesk call), improving the accuracy of the bridged tap length estimation will permit the operator to better know where in the network the impairment has the most probability to occur. And as such, better manage the field intervention.

Figure 2:
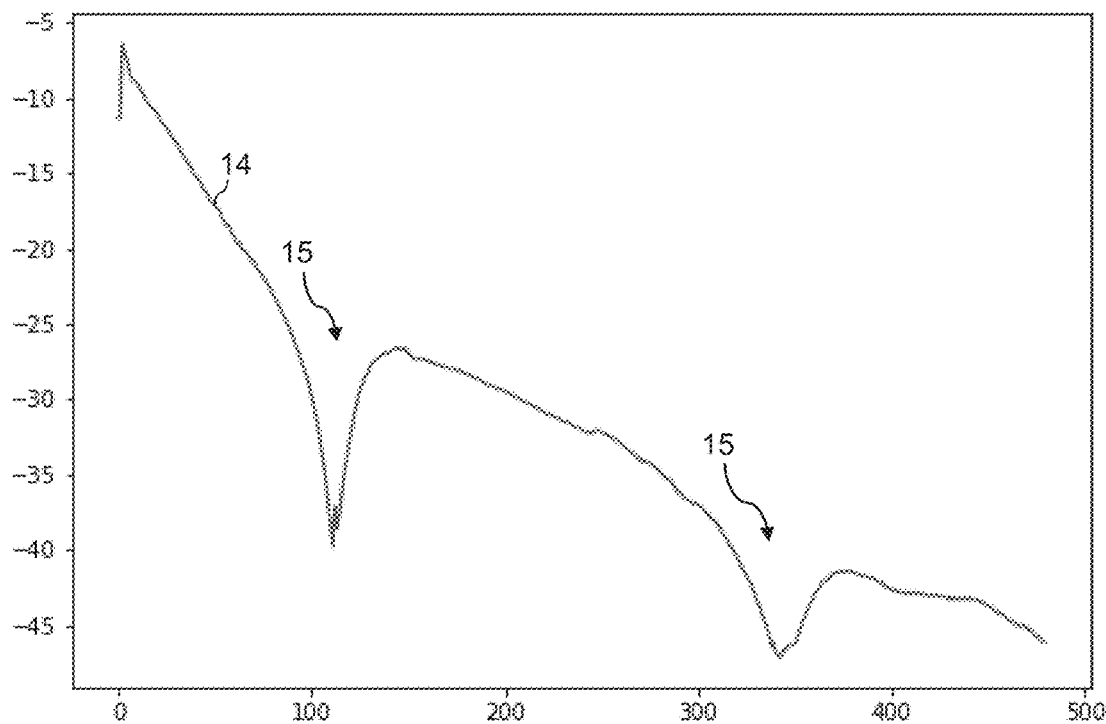
FIG. 2 is a graph of the channel frequency response of the communication line of FIG. 1.

FIG. 2 is a graph of a channel frequency response of a communication line 10 affected by a bridged tap 11. More specifically, the example of FIG. 2 relates to a Digital Subscriber Line (DSL). The curve is commonly expressed in dB and called H log in the DSL context, and depends on many topological factors, such as the loop length, the wire gauge (line impedance), the insulation type, the connector properties . . . . A typical format for H log is expressed in dB over 512 groups of frequencies.

The H log curve 14 is sensitive to the presence of any impairment(s) or, in general, to the presence of any unexpected topological configuration. In particular, as can be seen on FIG. 2, in the presence of a bridged tap 11, such H log curve 14 presents some dips 15 in its shape. The location and shape of the dips 15 depend on the bridged tap configuration, in particular its length.

FIG. 3 is a block diagram of a communication network 1 based on DSL technology. The communication network 1 comprises one or more access nodes 2, one or more terminals 3, one or more communication lines 4 and an apparatus 5.

An access node 2 is for example a DSLAM including a plurality of DSL modems and is connected to one or more terminals 3 by respective communication lines 4. A terminal 3 is for example a Customer Premises Equipment including a DSL modem. An access node 2 and a terminal 3 use DSL technology for communication over a communication line 4. A communication line 4 is for example a twisted copper pair.

An access node 2 and/or a terminal 3 may be configured for providing operational data representative of the functioning of the DSL modems and of the communication line 4. The operational data may specify the channel frequency response of the communication line 4, as measured by the modems of the access node 2 and/or the terminal 3.

The apparatus 5 comprises a monitoring device 6 and a configuration device 7.

The monitoring device 6 may obtain the operational data provided by the access nodes 2 and/or terminals 3 and perform various monitoring and managing function based on the operational data, such as impairment detection, dynamic line configuration, status visualization and reporting . . . . In particular, for a communication line 4 which has been detected has affected by one or more bridged taps, the monitoring device 6 may estimate or determine the lengths of bridged taps based on the channel frequency response of the communication line 4. Techniques for length estimation are described in more details hereafter. In this description, estimating the length, determining the length, determining an estimation of the length, predicting the length . . . may be used as equivalent expressions.

The configuration device 7 may generate and provide to the monitoring device 6 a machine learning model configured for determining, based on the channel frequency response of a communication line 4, a pair of lengths of bridged taps connected to the communication line 4.

Note that the distinction between the monitoring device 6 and configuration device 7 is functional. The monitoring device 6 and configuration device 7 may be computer-implemented devices. In some embodiments, the monitoring device 6 and the configuration device 7 correspond to distinct computers or groups of computers. For example, the monitoring device 6 correspond to a server controlled by a network operator and the configuration device 7 correspond to a server controlled by a data analytics company. In other embodiments, the monitoring device 6 and the configuration device 7 may correspond to the same computer or group of computers, for example to a server controlled by a network operator.

FIG. 4 is a flowchart of a method executed by the configuration device 7.

The configuration device 7 generates or obtains a training dataset (Step S1). The training dataset specifies, for plurality of communication lines affected by one or two bridged taps:
- the channel frequency response, and
- a pair of lengths of the bridged taps.

The pair of lengths is specified with the length $L_{long}$ of the longer bridged tap first, followed by the length $L_{short}$ of the shorter bridged tap: $[L_{long}\ L_{short}]$ When the communication line has only one bridged tap, $L_{short}=0$.

More generally, in some embodiments, the training dataset specifies, for plurality of communication lines affected by one or more bridged taps:
- the channel frequency response, and
- a set of M lengths of the bridged taps, with M equal to or greater than two. The set of M lengths may be ordered from longer to shorter, and some of the lengths may be equal to zero for a communication line with less than M bridged taps. The following description will focus on embodiments with a pair of lengths.

For example, various combination of bridged tap lengths and configurations are considered. The bridged tap configurations relate to gauge/impedance, termination type, single or double wire . . . . For a given combination of bridged taps lengths $[L_{long}\ L_{short}]$ and configuration, the configuration device 7 uses circuit simulation techniques to determine the channel frequency responses of the communication line. Circuit simulation is the task of determining one or more properties of an electrical or electronical circuit based on the model of the circuit.

A simulated channel frequency response and the corresponding pair of lengths $[L_{long}\ L_{short}]$ form a training sample of the training dataset, where the pair of lengths $[L_{long}\ L_{short}]$ may be regarded as the label for supervised training.

In some embodiments, data augmentation techniques are used for increasing the number of training samples obtained based on simulation and covering more real-world situations. For example, a new training sample may be obtained by modifying the channel frequency response of a communication line obtained by simulation, based on adding modem measurement effects typically observed in measured curves.

The channel frequency response may be expressed as a vector of N values corresponding to N frequencies or frequency groups. Typically, N=512 in the DSL context. This is a commonly used format and may results from an aggregation of a larger curve, depending on the technologies. For instance, in VDSL2 17 Mhz, a measured H log of 4096 tones is aggregated by a ratio of 1:8, producing a H log curve of 512 tone groups.

Then, the configuration device 7 trains a machine learning model based on the generated training dataset (step S2).

The machine learning model is configured for determining a pair of length $[L_{long}\ L_{short}]$ based on the channel frequency response of a communication line affected by one or more bridged taps. For example, the machine learning model takes as input a vector of size N specifying the channel frequency response, and outputs a vector $[L_{long}\ L_{short}]$.

Various architecture of machine learning model may be used, and an example is described later in reference to FIG. 5.

Training the machine learning model comprises setting the values of parameters of the models, for example weights and biases, based on the training dataset. This may involve the stochastic gradient descent algorithm or another training algorithm. The training samples may be processed by batches.

The stochastic gradient descent algorithm and other training algorithms are based on determining an error and updating model parameters based on the error. In some embodiments, training comprises determining, for a batch of one or more training samples, an error which depends on at least one of:
- A comparison between target lengths $[L_{long}\ L_{short}]_{target}$ and predicted length $[L_{long}\ L_{short}]_{predicted}$. Here, target refers to the values specified by a training sample of the training dataset, and predicted refer to the values determined by a forward pass of the training process.
- A distribution of bridged tap lengths in the communication network.

For example, in some embodiments, the configuration device 7 uses the Mean Square Error:

$$MSE_{[batch]} = mean_{[batch]}(([L_{long}L_{short}]_{predicted} - [L_{long}L_{short}]_{target})^2)$$

In other embodiments, the configuration device 7 uses a relative Mean Square Error, which allows to be more tolerant for long bridged tap. Indeed, from an operator perspective, in particular for the domain separation task, a 2 meter error on a 40 meter bridged tap is more acceptable than on a 5 meter bridged tap. The relative Mean Square Error may be:

$$MSE_{[batch]} = mean_{[batch]}((([L_{long}L_{short}]_{predicted} - [L_{long}L_{short}]_{target})/[L_{long}L_{short}]_{target})^2)$$

Other formulas for the relative means square error may process each length separately and sums the ratio, e.g.:

$$MSE_{[batch]} = \text{mean}_{[batch]}(((L_{long\_predicted} - L_{long\_target})/L_{long\_target})^2 + L_{short\_predicted} - L_{short\_target})/L_{short\_target})^2$$

In other embodiments, the configuration device 7 uses a network dependent error, which allows to match the bridged tap length accuracy to the bridged tap length dominantly present in the network. For example, the configuration device 7 considers the distribution of the bridged tap lengths in the network.

In some case, the configuration device 7 has some knowledge about the bridged tap lengths distribution, noted for example noted (dist(L) in the case of a one-dimensional distribution or dist($[L_{long}\ L_{short}]$) in the case of a 2D distribution. In such case, the network dependent Mean Square Error may be:

$$MSE_{[batch]} = \text{mean}_{[batch]}(\text{dist}([L_{long}L_{short}]_{target})*([L_{long}L_{short}]_{predicted}[L_{long}L_{short}]_{target})^2)$$

In other case, the configuration device 7 does not have a priori knowledge of the distribution. In such case, the network dependent Mean Square Error may be:

$$MSE_{[batch]} = \text{mean}_{[batch]}(w[L_{i,long}L_{i,short}]_{target}*([L_{i,long}L_{i,short}]_{predicted} - [L_{i,long}L_{i,short}]_{target})^2) \quad (3)$$

where w is a weight related to the best value of the best known estimation of a real network distribution at the given iteration. Indeed, as the tap length is not known in advance, as this is the purpose of this method, an iterative method, for instance following the Expectation-Maximization (EM) approach, would be required and is suitable. In that approach, the configuration devices 7 obtains network data specifying the channel frequency responses for a plurality of communication lines, in a real communication network. Then, the configuration device 7 iteratively:
  update the parameters of the machine learning model based on a batch from the training dataset, and an estimation of the length distribution.
  determines the lengths of the bridged taps based on channel frequency responses and the updated machine learning model, and
  update the estimation of the length distribution based on the determined lengths.

For example, the weight w can get initialize to the 1.0 value, in order to train a model without an a-priori knowledge on the tap length. At each following complete learning cycle, or even more efficient over the batch iterations of a single learning event, the estimation of the tap length normalized distribution can get updated and refined. Formally, at each iteration j, $$w_j[L_{long}L_{short}] = \text{alpha}*\text{dis}_{network}([L_{long}L_{short}]_{test,j}) + (\text{alpha}-1)*\text{dis}_{network}([L_{long}L_{short}]_{test,j-1}), \text{ with } 0.0 <= \text{alpha} <= 1.0 \text{ and sum}(\text{dis}_{network}) = 1.0$$

After some iterations, wj converges, hence wj=w as there will not be any significant improvements over j.

Then, at least in embodiments wherein the configuration device 7 and the monitoring device 6 are distinct from each other, the configuration device 7 deploys the trained machine learning model in the monitoring device 6 (step S3). This involves sending data representative of the architecture and/or parameters of the trained machine learning model to the monitoring device 6, thereby directly obtaining a monitoring device 6 configured for using the trained machine learning model.

Generating a training dataset which is based on a variety of bridged tap lengths and configurations allows to obtain a trained machine learning model capable of accurately estimating bridged tap lengths for a plurality of communication lines having different configurations (single wire or double wire bridged tap, open or closed termination, impedance/gauge . . . ). Selecting a set of M lengths as label for supervised training allows to cover configuration with one or more bridged taps, for example a pair of bridged taps. If the lengths in the training dataset are ordered, this information is also provided by the machine learning model.

Moreover, in some embodiments, training based on a relative error allows to improve relative accuracy for both short and long bridged taps. Also, in some embodiments, training based on a network dependent error based on a bridged tap length distribution allows to improve accuracy for most frequent bridged taps lengths.

Comparative tests have shown that the machine learning model determines bridged tap lengths with improved accuracy and better confidence, in comparison with known empirical methods based on analysis of the shape of a channel frequency response.

FIG. 5 is a block diagram of a machine learning model 20, which is used by the apparatus 5 in some embodiments.

The machine learning model 20 is convolutional neural network. The input of the machine learning model 20 is a vector of size N representing the channel frequency response of a communication line 4, and the output of the machine learning model 20 is a pair of lengths [$L_{long}\ L_{short}$] representing an estimation of the length of the bridged tap(s) associated with the communication line 4.

The machine learning model 20 comprises a first convolutional layer 21, a first pooling layer 22, a second convolutional layer 23, a second pooling layer 24 and a regression layer 25, arranged in series.

The first convolutional layer 21 comprises a plurality of filters of size $1 \times D_1$. The second convolutional layer 22 comprises a plurality of filters of size $1 \times D_2$. The H log curve of an impaired line typically presents a repetition of patterns indicative of the impairment type, for example of a bridged tap. The combination of two convolutional layers allows detecting the patterns and their repetition. For an input curve with N=512, example sizes are $D_1 <= 8$ and $D_2 >= 10$. Another important aspect of convolutional filtering is the number of filters in use. From the machine learning best practice theory, lower is the complexity of a model, higher is its ability to generalize. As there is a direct relationship between the number of filters in use toward the number of features to combine and therefore toward complexity, the lower, the better. However, we would like anyway to extract enough features to be able to perform an accurate prediction. There is a trade-off therefore to make. A preferred design is therefore between 8 and 16 fundamental shapes, but not much. Proposing more than 16 filters, as this is common in computer vision, is not relevant here. By contrast, proposing fewer filters (e.g. <4) will not allow to detect or make the distinction between some of the fundamental shapes, making impossible to detect or separate the different impairments.

The pooling layers 22 and 24 allow reducing the size of the features maps and therefore the complexity of the model. This comes from the fact that, as convolution mitigate neighboring values, there is a redundancy of information between neighboring outputs. There is therefore at this stage opportunity to reduce the model complexity. Knowing that the final output consists only in the prediction of a pair of scalar value ($L_{long}$ and $L_{short}$) and knowing that there is an intrinsic smoothing effect, the pooling layers 22 and 24 may perform fairly high pooling (down sampling), usually by a 1:X ratio, where X is usually equal or smaller than the size of the filter. In our case, this means a pooling <1:8 in the first pooling layer 22, and of <1:10 in the second pooling layer 24.

The regression layer 25 is also made of neurons and belong to the same neural network, as visible in FIG. 5. Compared to the convolutional part, the purpose is to establish a relationship between all the features and the pair [$L_{long}$ $L_{short}$] to predict. At that stage, there is therefore no convolutional filtering nor pooling, but only connections between all neurons toward other layer neurons. The regression layer 25 may be a fully-connected part comprising an input layer, a hidden layer and an output layer. The input layer receives the features provided by the convolutional part (convolutional layers 21, 23, pooling layers 22, 24). The output layer comprises a pair of neurons which outputs the values [$L_{long}$ $L_{short}$].

Beside these aspects, usually the major difference between the neuronal model proposed for feature extraction and for regression resides in the difference between the activation function. Typically, Rectified Linear Unit (ReLU) activation functions are used to perform convolution using neurons (which is a linear process), while non-linear activation functions are preferred for regression purpose. This is the preferred option. However, as the coefficient to predict is continuously and fairly uniformly distributed, this makes no sense to opt for saturating activation functions like SoftSign or Tan H. In that sense, it has been preferred to opt for eLU function for our use-case.

Finally, the main tuning factor in this fully connected stage is the amount of neurons in-use. Between the number of feature and the pair of scalar output values, a fairly low number of neurons (<128) may been chosen. From a domain expertise, there is no valid reason at this stage to introduce extra complexity in the model by adding extra layers. A single regression layer is therefore chosen and will be finally connected to the output layer consisting in two neurons outputting the values $L_{long}$ and $L_{short}$ to predict. More generally, the output layer comprises M neurons for M lengths.

FIG. 6 is a flowchart of a method executed by the monitoring device 6.

The monitoring device 6 obtains data specifying the channel frequency response CFR of a communication line 4 (step T1). For example, the monitoring device 6 collects channel frequency responses CFR from access nodes 2 on a regular basis, e.g. every 15 minutes.

Then, the monitoring device 6 determines, based on the channel frequency response CFR, whether the communication line 4 is affected by one or more bridged taps (Step T2). Various techniques are known for detecting bridged taps, including deep-learning based techniques. The following steps may be performed in response to detecting bridged tap(s).

The monitoring device 6 determines a pair of lengths [$L_{long}$ $L_{short}$] based on the channel frequency response CFR (step T3), by using the trained machine learning model. The pair of lengths [$L_{long}$ $L_{short}$] represents an estimation of the lengths of bridged taps affecting the communication line 4. The machine learning model may output $L_{short}$=0, which means it is estimated that only one bridged tap is present.

The bridged tap lengths may be used for various functions. When bridged tap length estimation is performed for a plurality of communication lines, statistics may be determined and displayed to represent technical information about the communication network 1. Also, the bridged tap lengths may be used for domain separation and repair action selection.

For example, in some embodiments, the monitoring device 6 determines, based on the pair [$L_{long}$ $L_{short}$], a location of the bridged taps (Step T4). The location may be specified by one of a plurality of domain, for example operator domain, street/field domain, customer domain. Known domain separation techniques allow determining a domain based on a bridged tap length. The monitoring device 6 may determine a repair action based on the domain separation (Step T5). For example, the repair action comprises sending a technician to the specified location, to remove the bridged tap.

Steps T1 to T5 may be performed for a plurality of communication lines 4. Accordingly, the bridged tap lengths and domain may be determined for a plurality of communication line 4. This allows comparing the cost/benefit of a repair action for respective communication lines 4 or groups of communication lines 4.

FIG. 7 is a block diagram representing the structural architecture of an apparatus 30. The apparatus 30 may correspond to one of the apparatus 5, the monitoring device 6 and the configuration device 7.

The apparatus 30 comprises a processor 31 and a memory 32. The memory 32 stores computer program code P. The memory 32 and the computer program code P are configured for, with the processor 31, causing the apparatus 30 to perform, at least in part, the method described with reference to FIG. 4 and/or FIG. 6.

In the context of this description, a machine learning model is a function for outputting an output based on an input, which depends on trainable parameters. An example of machine learning model is a neural network, with weights and biases as parameters. Training the machine learning model is the task of determining the parameters of the model based on training data.

It should be noted that although examples of methods have been described with a specific order of steps, this does not exclude other implementations. In particular, the described steps may be executed in another order, partially or totally in parallel . . . .

It is to be remarked that the functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared, for example in a cloud computing architecture. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Their function may be carried out through the operation of program logic, through dedicated logic, through the interaction of program control and dedicated logic, or even manually, the particular technique being selectable by the implementer as more specifically understood from the context.

It should be further appreciated by those skilled in the art that any block diagrams herein represent conceptual views of illustrative circuitry embodying the principles of the invention. Similarly, it will be appreciated that any flow charts represent various processes which may be substantially represented in computer readable medium and so executed by a computer or processor, whether or not such computer or processor is explicitly shown.

While the principles of the invention have been described above in connection with specific embodiments, it is to be clearly understood that this description is made only by way of example and not as a limitation on the scope of the invention, as defined in the appended claims.

The invention claimed is:

1. An apparatus comprising
a memory configured to store executable code; and
a processor configured to execute the executable code and cause the apparatus to perform the operations of
generating a dataset specifying, for each communication line of a plurality of communication lines,
a channel frequency response of a respective communication line of the plurality of communication lines, the communication line having one or two bridged taps, and
a set of M lengths of bridged taps associated with the respective communication line, with M greater than one, and
training, based on the dataset, a machine learning model, the machine learning model configured for determining, based on the channel frequency response of the respective communication line, a set of M lengths of bridged taps associated with the respective communication line.

2. The apparatus according to claim 1, wherein the training the machine leaning model comprises updating parameters of the machine learning model based on an error representative of a relative comparison between target lengths and predicted lengths.

3. The apparatus according to claim 1, wherein the training the machine leaning model comprises updating parameters of the machine learning model based on an error representative of a comparison between target lengths and predicted lengths and of a length distribution associated with a communication network.

4. The apparatus according to claim 3, wherein the processor is configured to further cause the apparatus to perform
determining said length distribution based on iteratively,
updating parameters of the machine learning model based on the dataset and a current estimation of the length distribution,
determining lengths based on the updated machine learning model and the channel frequency responses of the plurality of communication lines of a real communication network, and
updating the current estimation of the length distribution based on the determined lengths.

5. The apparatus according to claim 1, wherein the generating the dataset comprises determining the channel frequency responses based on circuit simulation.

6. The apparatus according to claim 1, wherein the generating the dataset comprises determining the channel frequency responses for a plurality of communication lines having a single wire bridged tap and for a plurality of communication lines having a double wire bridged tap.

7. The apparatus according to claim 1, wherein the generating the dataset comprises determining the channel frequency responses for a plurality of communication lines having an open-ended bridged tap and for a plurality of communication lines having a close-ended bridged tap.

8. The apparatus according to claim 1, wherein the generating the dataset comprises determining the channel frequency responses for a plurality of communication lines having only one bridged tap and for a plurality of communication lines having at least two bridged taps.

9. The apparatus according to claim 1, wherein the processor is configured to further cause the apparatus to perform:
obtaining the channel frequency response of the respective communication line, and
determining a set of M lengths of bridged taps associated with the respective communication line, based on the channel frequency response and the trained machine learning model.

10. A computer-implemented method comprising:
generating a dataset specifying, for each communication line of a plurality of communication lines,
a channel frequency response of a respective communication line of the plurality of communication lines having one or two bridged taps, and
a set of M lengths of bridged taps associated with the respective communication line, with M greater than one,
training, based on the dataset, a machine learning model, the machine learning model configured for determining, based on the channel frequency response of the respective communication line, a set of M lengths of bridged taps associated with the respective communication line.

11. The method according to claim 10, comprising:
deploying the trained machine learning model in another apparatus.

12. An apparatus obtained by the method of claim 11, comprising a processor configured to:
obtain the channel frequency response of the respective communication line,
determine a set of M lengths of bridged taps associated with the respective communication line, based on the channel frequency response and the trained machine learning model.

13. A computer-implemented method for monitoring a communication network, comprising:
obtaining the channel frequency response of the respective communication line,
determining a set of M lengths of bridged taps associated with the respective communication line, based on the channel frequency response and a trained machine learning model generated by the method of claim 10.

14. A non-transitory computer-readable medium storing instructions, which when executed by a processor, causes an apparatus including the processor to perform the method of claim 10.

* * * * *